(12) United States Patent
Narasimhan (10) Patent No.: US 9,140,602 B2
(45) Date of Patent: Sep. 22, 2015

(54) NANOPHOTONIC LIGHT-FIELD SENSOR

(71) Applicant: The Board of Trustees of the Leland Stanford Junior University, Palo Alto, CA (US)

(72) Inventor: Vijay K. Narasimhan, Stanford, CA (US)

(73) Assignee: The Board of Trustees of the Leland Stanford Junior University, Palo Alto, CA (US)

(*) Notice: Subject to any disclaimer, the term of this patent is extended or adjusted under 35 U.S.C. 154(b) by 117 days.

(21) Appl. No.: 13/964,026

(22) Filed: Aug. 9, 2013

(65) Prior Publication Data

US 2014/0043611 A1 Feb. 13, 2014

Related U.S. Application Data

(60) Provisional application No. 61/682,220, filed on Aug. 11, 2012.

(51) Int. Cl.
| | |
|---|---|
| *H04N 5/225* | (2006.01) |
| *G01J 1/42* | (2006.01) |
| *G01J 1/04* | (2006.01) |
| *B01J 13/02* | (2006.01) |
| *B01J 13/20* | (2006.01) |

(52) U.S. Cl.
CPC .. *G01J 1/42* (2013.01); *B01J 13/02* (2013.01); *B01J 13/203* (2013.01); *G01J 1/0407* (2013.01); *G01J 1/0411* (2013.01); *G01J 1/0488* (2013.01); *G01J 1/4228* (2013.01)

(58) Field of Classification Search
USPC .......................................... 356/402
See application file for complete search history.

(56) References Cited

U.S. PATENT DOCUMENTS

| | | | |
|---|---|---|---|
| 2002/0018964 A1* | 2/2002 | Jerominek | ..... 430/313 |
| 2009/0091644 A1* | 4/2009 | Mackey | ..... 348/273 |
| 2013/0128077 A1 | 5/2013 | Georgiev | |
| 2014/0127305 A1* | 5/2014 | Ortac et al. | ..... 424/490 |

\* cited by examiner

*Primary Examiner* — Roberto Velez
*Assistant Examiner* — Stephen Coleman
(74) *Attorney, Agent, or Firm* — Lumen Patent Firm (57) ABSTRACT

A light field sensor for a 4D light field camera has a layer of nanoscale resonator detector elements, such as silicon nanoshells, below a layer of dielectric microlenses. By taking advantage of photonic nanojets in the microlenses and circulating resonances in nanoshells, the light field camera sensor achieves improved sensitivity, pixel density, and directional resolution even at large angles of incidence.

10 Claims, 12 Drawing Sheets

2$^{nd}$ order     3$^{rd}$ order     4$^{th}$ order

NANOPHOTONIC LIGHT-FIELD SENSOR

CROSS-REFERENCE TO RELATED APPLICATIONS

This application claims priority from U.S. Provisional Patent Application 61/682,220 filed Aug. 11, 2012, which is incorporated herein by reference.

FIELD OF THE INVENTION

The present invention relates generally to light-field cameras, and specifically to nanoscale sensors for the same that provide both spatial and directional resolution.

BACKGROUND OF THE INVENTION

Figure 1A:
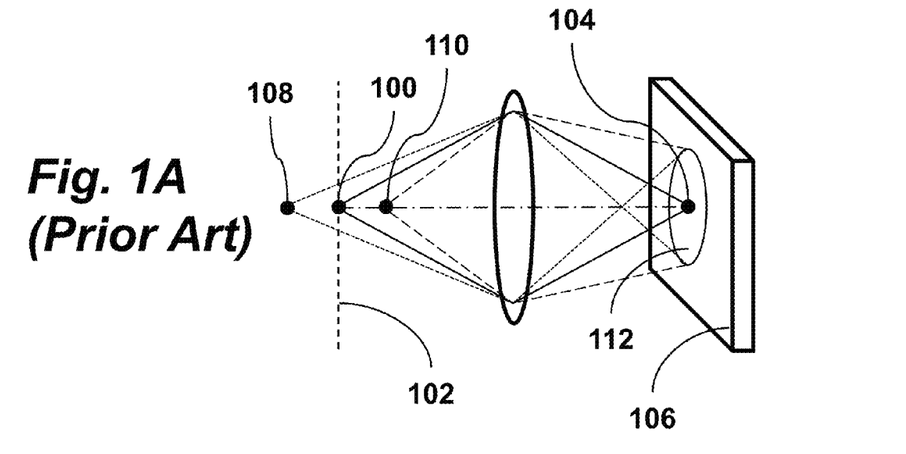
FIG. 1A is an illustration of the principle of operation of a traditional camera showing that light intensity from points in front of or behind the lens's front focal plane is spread over several photosites.

A traditional camera captures a projection of the light field into a two-dimensional sensor plane. The image represents the intensity of light falling on each photosite in the sensor, and all angular information about the light is lost. For example, as shown in FIG. 1A, a traditional camera is focused such that one point 100 on the front focal plane 102 corresponds to one point 104 on the sensor plane 106. The light intensity from points 108 and 110 on other planes is spread over a larger area 112 (i.e., multiple photosites) on the sensor 106, causing objects in other planes to appear blurry. Points 108 and 110 in front of or behind the front focal plane can produce overlapping intensity distributions, and sharp focus is difficult to recover after the image has been captured. However, if the angular information of the incident light at the sensors could be preserved (i.e., capturing the 4D light field), the position of points not sitting in the front focal plane could be computed, and the image could be refocused after the fact. In addition, multiple views of the same scene could be reconstructed from a single exposure for use in 3D images and multi-perspective panoramas. Such techniques are useful in a number of commercial systems both for scientific imaging and consumer applications.

Figure 1B:
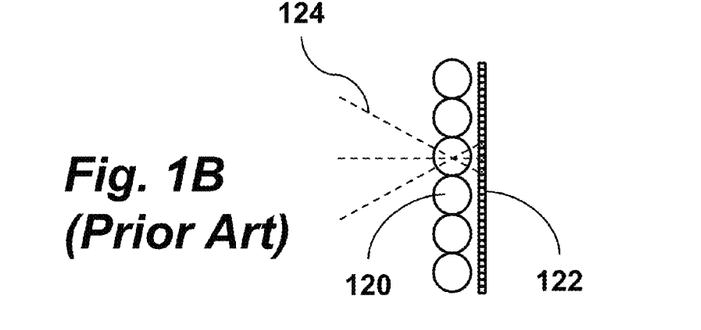
FIG. 1B illustrates an implementation of a conventional light-field sensor which has microlenses at the rear focus of the main camera lens, thereby separating light from different angles onto different photosites.

A number of modifications to traditional cameras have been proposed to capture the 4D light field in order to enable these novel photographic techniques. These include multiple lenses that offer slightly different views of a scene, stacked gratings above the image sensor that use Talbot pattern shifts to determine the angle of incidence of light from changes in light intensity on a photosite, and microlenses at the camera's rear focal plane that separate light from different angles onto different photosites. FIG. 1B illustrates this last approach, where incident rays 124 upon the sensor are focused on different photosites 122 by microlenses 120 just in front of the sensor plane.

In all of these cases, the cost of capturing additional angular information from the light field is a reduction in the number of pixels in the final image, a reduction in the amount of light falling on each photosite for a given exposure time, or both. More specifically, light-field cameras that use microlenses face the challenges of precise alignment of the microlenses with the sensor and aperture matching between the camera main lens and the microlens array. Current light field cameras face a trade-off between directional resolution and spatial resolution, and all designs suffer from slower shutter speeds due to light loss. The need for light-field sensors with high sensitivity and high photosite density is clear.

SUMMARY OF THE INVENTION

The present inventor has discovered how light-field sensors can benefit from photonic effects in nanoscale and microscale structures. By combining two photonic phenomena, namely photonic nanojets and resonances in nanoscale detector elements, the performance of light field camera sensors can be greatly improved.

Embodiments of the invention provide nanoshell photodetector elements that trap light in low-Q whispering gallery modes, resulting in broadband absorption enhancement in a dense, ultra-thin form factor that is compatible with both planar and curved sensors. The invention provides a detector based on nanoshells integrated directly with dielectric microlenses. By constraining the microlenses to a certain size, the photonic nanojet phenomenon is used to achieve a super-resolution focus adjacent to each microlens that extends over hundreds of nanometers. The invention thus provides a novel light-field sensor design that integrates these two elements and achieves directional resolution even through large angles of incidence.

Light-field cameras incorporating the invention have greater sensitivity, pixel density, and directional resolution by taking advantage of the unique photonic effects present in nanoscale and microscale structures. Semiconductor nanoshell whispering gallery resonators are a versatile platform for dense, ultra-thin photosite arrays. For example, an array of nanocrystalline silicon shells only 50 nm thick is as absorptive as a micron-thick planar film. The separation and size of the nanoshells may be tuned by etching the underlying nanosphere template and the array may be transferred onto a flexible substrate.

The invention provides a sensor architecture that uses the super-resolution foci formed by photonic nanojets emanating from small dielectric microlenses and microlens arrays to separate light into different nanoshell photosites depending on the angle of incidence. The proximity of the microlenses to the photosites corresponds to a small effective f-number, which enables main camera optics with very large apertures for light collection. Directional resolution in the integrated light-field sensor has acceptance angles of up to 35 degrees from normal incidence.

In one aspect, the present invention provides a photosensor used to capture the spatial and angular information from the 4D light field. This light-field sensor integrates nanoscale resonator photosites with super-resolution microlenses in a compact form factor. This sensor is simultaneously capable of high sensitivity, high pixel density, and directional resolution through very large incident angles. Because of these properties, enabled by the unique nanophotonic effects in nano- and microstructures, this sensor can enable a new generation of dynamic pictures with image quality rivaling traditional camera detectors.

The embodiments of the present invention provide a camera sensor for light-field sensing that integrates a nanoscale photosite array with microlenses capable of achieving super-resolution foci for directional resolution. The nanoscale photosites are designed to be highly absorptive through light trapping, thus providing an array of dense, sensitive elements for photodetection. Because of the proximity of the super-resolution focus to the aperture of the microlenses, the effective f-stop number is very small, so the limitation on the main camera lens is greatly relaxed. By integrating the two structures, a sensitive camera sensor with angle resolution through a large acceptance angle is realized. New features include using coupling a super-resolution focus in microlenses to nanoscale resonator detector elements to increase the density of photosites while reducing cross-talk for off-axis light through large angles of incidence.

One embodiment of the device architecture includes hollow nanoshell photosites beneath microlenses capable of achieving a super-resolution focus. Various other embodiments include lenses of different sizes and shapes, different photosite structures (e.g., nanocones), and different materials for photosites and lenses. Other nanoscale photosites with light trapping modes, such as nanocone elements, could be used.

The integration of nanoshells and microlenses provides higher sensitivity and pixel density with a lower f-stop number than existing light field technologies using microlenses for directional resolution. This results in a sensitive light field sensor with angle resolution through a very large range of acceptance angles. Crosstalk is also reduced in this design at high angles. This novel design eliminates the need for a precise separator between the microlenses and the sensor since lenses are positioned directly above the sensor and because the super-resolution focus persists over several wavelengths. The ultra-thin device architecture can be readily integrated into non-planar sensor designs for reduced aberration, increased brightness and sharpness off-axis, and novel compound eye architectures.

In one aspect, the invention provides a light field sensor including a collection of nanoscale resonator detector elements arranged in a layer and a collection of dielectric microlenses arranged in a layer. Each microlens has a refractive index and size selected such that the microlens focuses incident light at an operational wavelength into a beam having a full-width-half-maximum intensity beam waist of less than one half of the operational wavelength when measured adjacent to the microlens. Each detector element encloses a volume of at least that enclosed by the full-width-half-maximum intensity beam waist of the beam and has a total external leakage rate to adjacent detector elements that does not exceed the intrinsic leakage rate of the element due to absorption.

In some instances, the nanoscale resonator detector elements may be packed in a plane such that a minimum fill fraction in the plane is 82%. The nanoscale resonator detector elements may be nanoshells composed of semiconductor materials. The microlenses may have the shape of a sphere, cylinder, or ellipsoid. The nanoshell resonator detector elements may be surrounded by a planarization layer composed of glass or polymers. In some instances, a color filter array is integrated into the planarization layer, and in some instances the microlenses filter color.

DETAILED DESCRIPTION

One approach to implementing a light field imaging sensor is to use an array of photosites and place microlenses above this array to direct light from different angles into a unique set of photosites; determination of the incident angle can therefore be computed based on the spatial pattern of the light collected from the photosites. Very small focal spots can be achieved in microlenses less than 9 μm (or even up to 30 μm for lenses with higher indices of refraction) owing to photonic nanojets at normal incidence. This allows the size of the photosites to potentially be reduced to the nanoscale; however, at higher angles of incidence the light pattern falling on planar photosites is not uniquely related to the angle, and therefore the deconvolution of intensity and angle information from the light field image would be hampered. However, if nanoscale resonator photosites, for example nanoshells or nanocones, are used instead, light can be coupled uniquely from the photonic nanojets into highly absorptive resonances even at very high angles of incidence. Moreover, the effect is broadband: unique patterns are achieved for blue, green, and red wavelengths of light, which is critical for visible light imaging and color imaging.

Figure 2:
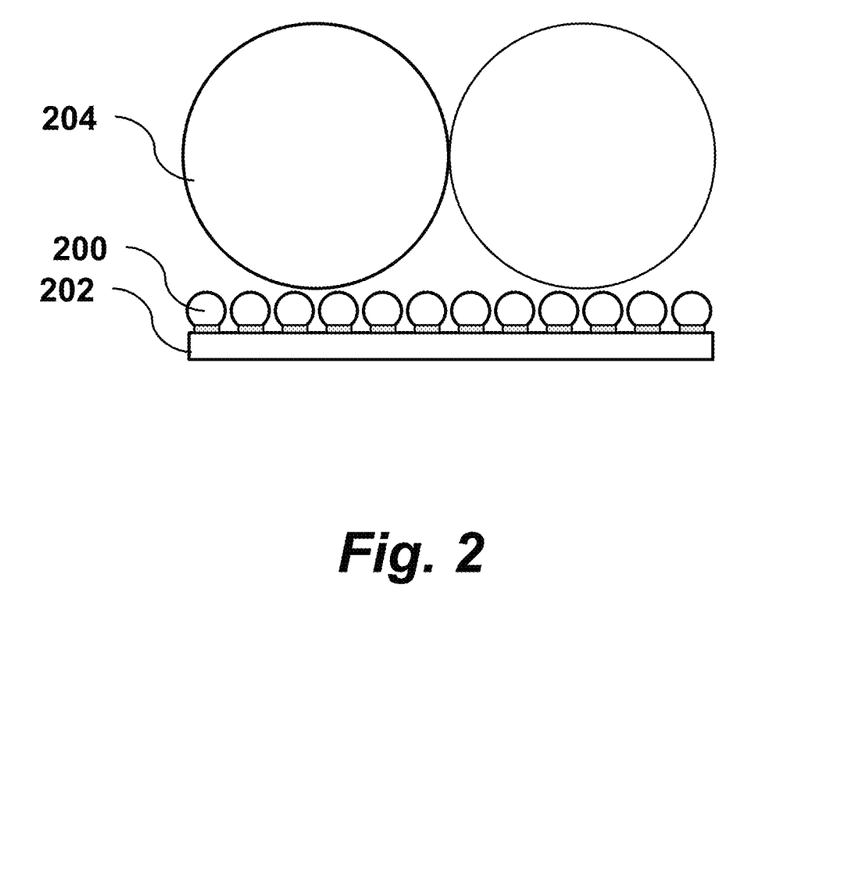
FIG. 2 is a schematic drawing of nanophotonic light field sensor, according to an embodiment of the invention.

Accordingly, as shown in FIG. 2, one embodiment of the present invention is a sensor device that includes an array of nanoscale photosites in the form of nanoshells 200 integrated with underlying electronics 202. Positioned above the nanoshell array is an array of microlenses 204. For clarity of illustration, the figure shows a cross-section of just a portion of the sensor device including two microlenses and twelve photosites. A complete sensor may have thousands of microlenses and millions of photosites. The description below focuses first on the photosites, followed by the microlenses and then the integrated device. The underlying electronics may consist of any suitable system which could be used to read electronic information corresponding to the light pattern falling on the photosites, such as the electronics used in current back-side-illuminated photo detectors.

Figure 3A:
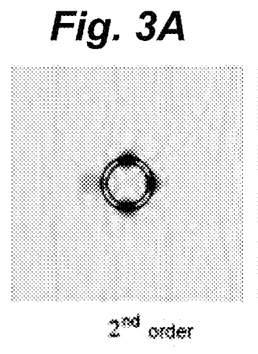
FIGS. 3A, 3B, 3C show FIT-simulated field distribution and intensity in a silicon nanoshell, illustrating the 2nd, 3rd, and 4th order resonances, according to an embodiment of the invention.
Figure 3B:
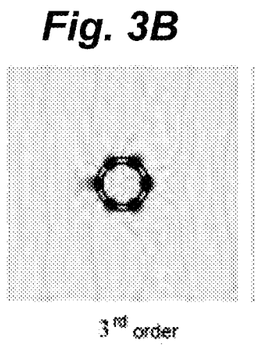
Figure 3C:
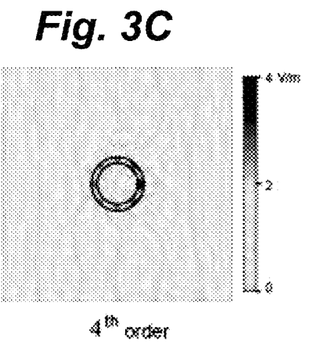
Figure 3D:
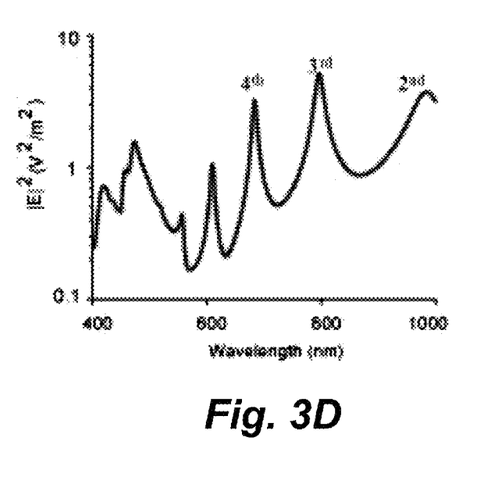
FIG. 3D is a graph of field intensity vs. wavelength, showing the 2nd, 3rd, and 4th order resonant peaks according to an embodiment of the invention.

Hollow semiconductor spheres called nanoshells have an optical property known as whispering gallery modes at multiple wavelengths. In nanoshell arrays laid on a substrate, the circulating modes are preserved. We demonstrate this effect using various models (3D FIT simulations and 2D FDFD simulations) to approximate silicon nanoshells with an inner diameter of 175 nm and a thickness of 50 nm sitting on top of a perfectly-matched layer. For example, FIGS. 3A, 3B, 3C show FIT-simulated field distribution and intensity in a silicon nanoshell of inner radius 175 nm, thickness 50 nm, illustrating the 2nd, 3rd, and 4th order resonances (986 nm, 796 nm, and 685 nm), respectively. Plane waves have the electric field perpendicular to the plane of the page and are incident from the left-hand side. Based on the calculation of the quality factor for such nanoshells, which ranges from 20-100 for the resonances of interest, light couples into circulating resonant modes and circulates from 1-3 times around the shell before being absorbed, increasing the path length by up to 20 times compared to a planar layer of the same thickness. FIG. 3D is a graph of field intensity vs. wavelength, showing the 2nd, 3rd, and 4th order resonant peaks.

Figure 4A:
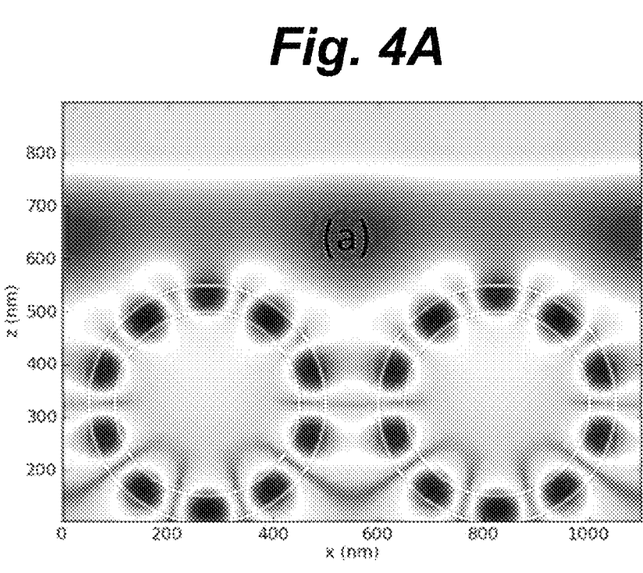
FIGS. 4A and 4B show the simulated field distribution of 5th order resonances in nanoshells, according to an embodiment of the invention.
Figure 4B:
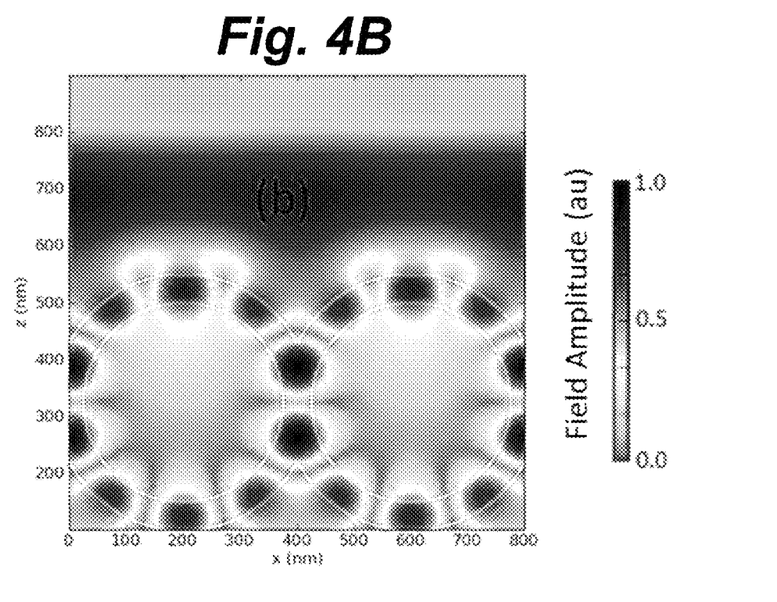

Nanoshell photosites can trap light in resonant modes, which cause light to couple into the material and circulate before being absorbed. Modes persist whether shells overlap or not. The array of nanoshells demonstrates a 5th order resonance at 660 nm when the nanoshells are separated by 100 nm and at 675 nm when they overlap. FIGS. 4A and 4B show the simulated field distribution of 5th order resonances in nanoshells having inner radius 175 nm, thickness 50 nm on top of a perfectly-matched layer. FIG. 4A shows shells separated by 100 nm (excitation wavelength 660 nm), and FIG. 4B shows shells overlapping through the thickness of 50 nm (excitation wavelength 675 nm). This is a 2D FDFD approximation of the structure with periodic boundary conditions on the left and right sides. Plane waves have the electric field perpendicular to the plane of the page and are incident from the top. The electric field ($E_y$) is shown. While overlap of the resonator elements and external leakage between adjacent elements may aid overall absorption for photodetector applications such as solar cells, the external leakage rate between adjacent photosites is minimized in embodiments of the present invention by eliminating overlap of adjacent nanoscale resonator elements above a substrate level to ensure unique light patterns corresponding to different angles of incidence.

In one embodiment of the invention, nanoshells are fabricated using monodispersed suspensions of colloidal silica nanospheres coated onto substrates (for example, quartz and silicon) as a template.

Figure 5A:
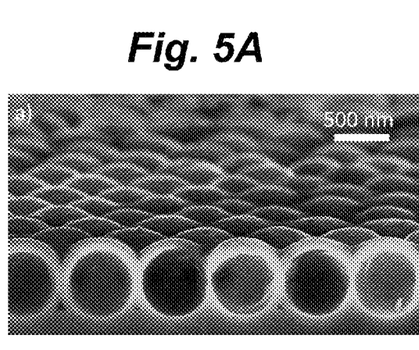
FIGS. 5A and 5B are SEM micrographs of nanoshell arrays fabricated according to an embodiment of the invention.
Figure 5B:
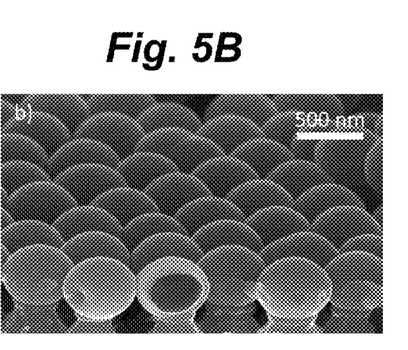

For example, FIGS. 5A and 5B are SEM micrographs of nanoshell arrays fabricated using nanocrystalline silicon deposited conformally on the surface of a silica nanosphere array by low-pressure chemical vapor deposition (LPCVD) of $SiH_4$ at 620° C. to form semiconductor nanoshells for photosites. More specifically, arrays of nanoshells may be fabricated by first synthesizing monodispersed suspensions of colloidal silica nanospheres using a modified Stober technique; these spheres may then be coated onto substrates (for example, quartz and silicon) using the Langmuir-Blodgett (LB) method to form a close-packed layer.

Any other method suitable for depositing layers of nanospheres, including dip-coating and rod-coating, could be used to form the template. Nanosphere templates could be made from any other suitable material, including PMMA, polystyrene, or alumina. Any other suitable thin film technique could be used to deposit other materials for the nanoshells.

Finally, if desired, the silica nanospheres are dissolved in a hydrofluoric acid solution, leaving an array of hollow silicon nanoshells. The resulting structure is an overlapping array of nanoshells, as shown in FIG. 5A which is a SEM micrograph of nanoshell arrays silicon deposited as-is on silica spheres results in overlapping shells. The separation of the nanoshells from each other and from the substrate can be tuned by etching before thin-film deposition; for example, FIG. 5B shows that the overlap between nanoshells can be eliminated by first etching the silica nanosphere array in an electron cyclotron resonance (ECR) $SF_6$ plasma for 3 minutes at a −44V DC bias. This shrinks the silica nanosphere template by approximately 90 nm; subsequent deposition of a 43 nm silicon layer results in no overlap. Separating the nanoshells is useful for forming an array of nanoscale resonators with no overlapping volume above a substrate level.

Even a separation of 30 nm or less between shells, which is much smaller than the wavelength of light, is sufficient to result in unique light patterns. Preferably, the shells should not have any overlapping volume except at the substrate level and the lenses should be close-packed or nearly close-packed, thus preventing light from leaking as a plane wave and not being focused in a nanojet, causing multiple elements of the photodetector to be excited and potentially resulting in crosstalk.

Figure 6:
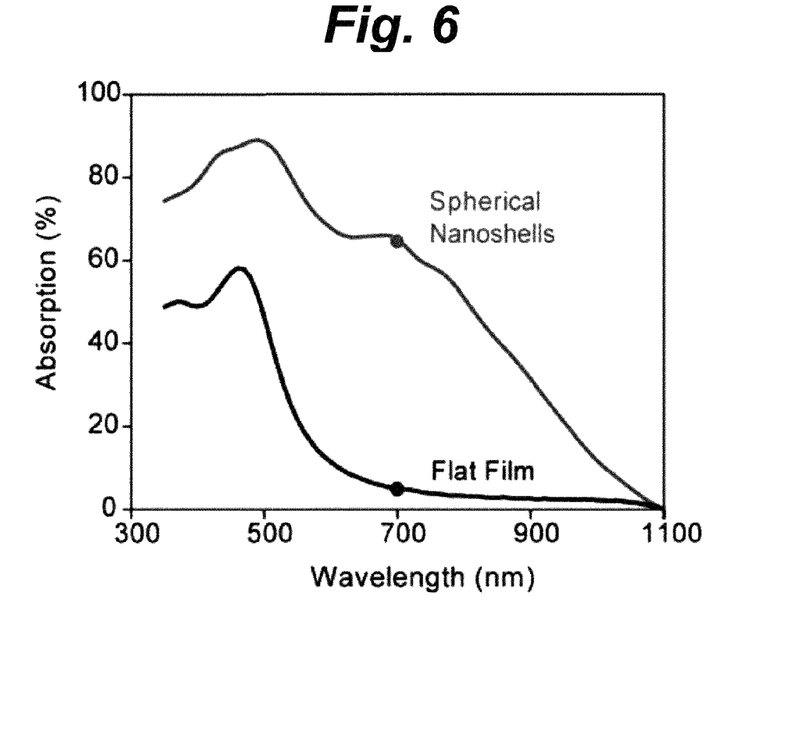
FIG. 6 is a graph showing absorptance in a nanoshell array across the visible spectrum.

The absorptance of the nanoshell array in FIG. 5A was measured in an integrating sphere under normal incidence and compared to a planar nanocrystalline silicon film deposited side-by-side with the sample and having the same thickness. As shown in the graph of FIG. 6, the absorptance is dramatically higher in the nanoshell array across the visible spectrum owing to the increased optical path length in the nanoshells. The integrated spectral absorption also showed favorable angle dependence, decreasing by only 10% over a 35 degree change in angle of incidence. Thus, nanoshells offer an attractive platform for dense, high-sensitivity photosites in light-field sensor applications.

Figure 7:
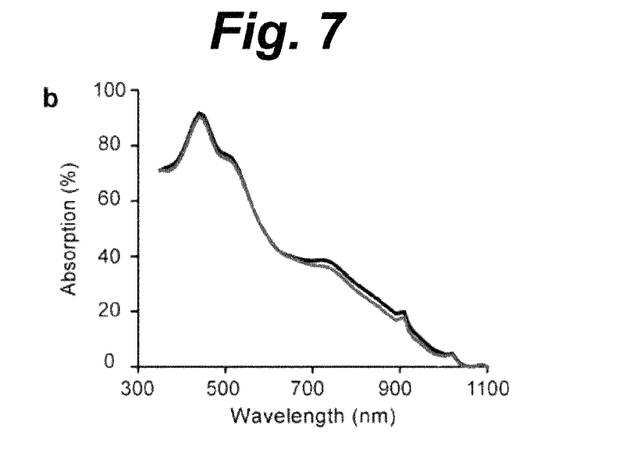
FIG. 7 is a graph showing two curves representing absorption measurements of nanoshells on flat and curved substrates, according to an embodiment of the invention.

Although many light-field cameras use planar image sensors, other architectures may be desirable. The ultra-thin nanoshell array of the present invention is well suited for non-planar substrates. The layer of shells can be grown on a flexible substrate (e.g., thin silicon) or etched and released from a thick substrate and transferred to a flexible film (e.g. PDMS). Using the latter process, the optical properties of the layer are preserved even under extreme bending to an 8 mm radius of curvature, as shown in FIG. 7 where the two curves represent absorption measurements of nanoshells on PDMS laid flat (dark curve) and bent to a radius of 8 mm (grey curve). Curved substrates could be used to reduce the complexity of the camera's main optics, reduce aberrations, and increase off-axis brightness and sharpness. Curved substrates could also be used to generate novel sensor architectures based on the compound eye.

We now describe the integration of the nanoshell photosites with small dielectric microspheres to achieve directional resolution. An array of microlenses may be formed above an array of nanoshells using the coating processes described earlier.

In some designs for light-field sensors that use a microlens array to resolve the angle of incident light, the main lens of the camera is at optical infinity from the perspective of the microlenses. As such, parallel rays converge to a point at the rear focal plane of each microlens. The photosensor must therefore be precisely positioned at the rear focal plane of the microlens array; deviations from this positioning result in misfocus blur. To avoid the overlap of images formed under different microlenses, the f-number of the main lens is matched to the f-number of the microlenses. A limit is therefore imposed on the aperture size of the main lens.

Owing to the dimensions of the photosites under the microlenses, the desired directional resolution, and the limitations mentioned above, the microlenses in use in conventional light field sensors have ranged in width from 125 μm in initial designs to 13.9 μm in commercial products. However, if even smaller microlenses are used, a new light-field sensor architecture based on photonic nanojets is enabled.

Plane waves incident on small dielectric particles in a certain size range (e.g. 2 μm to 9 μm for particles with refractive index 1.46) can form photonic nanojets (beams of high field concentration) with intensity waists of a half-wavelength or smaller. Nanojets in cylinders and spheres have been simulated and verified experimentally. These nanojets extend over several wavelengths from the edge of the particles both in free space and when particles are placed on top of substrates.

Photonic nanojets are propagating light beams focused by dielectric lenses characterized by a full-width-half-maximum beam waist smaller than that given by the diffraction limit lambda/2(n*sin(theta)), where lambda is the wavelength of operation, n is the diffraction limit of the imaging medium, and theta is the half-angle subtended by the lens. Nanojets also typically have a low divergence angle, meaning that the beam waist can remain close to the diffraction limit over several wavelengths. The existence of a photonic nanojet upon focusing through a microlens can be verified by observing the intensity profile of the field pattern produced by the lens both through numerical simulations and through experimental measurements. Nanojets are only produced by lenses within a certain range of sizes and refractive indices, as given by the Mie theory. The exact range of sizes and refractive indices also depends on the optical properties of the medium surrounding the lenses.

Figure 8:
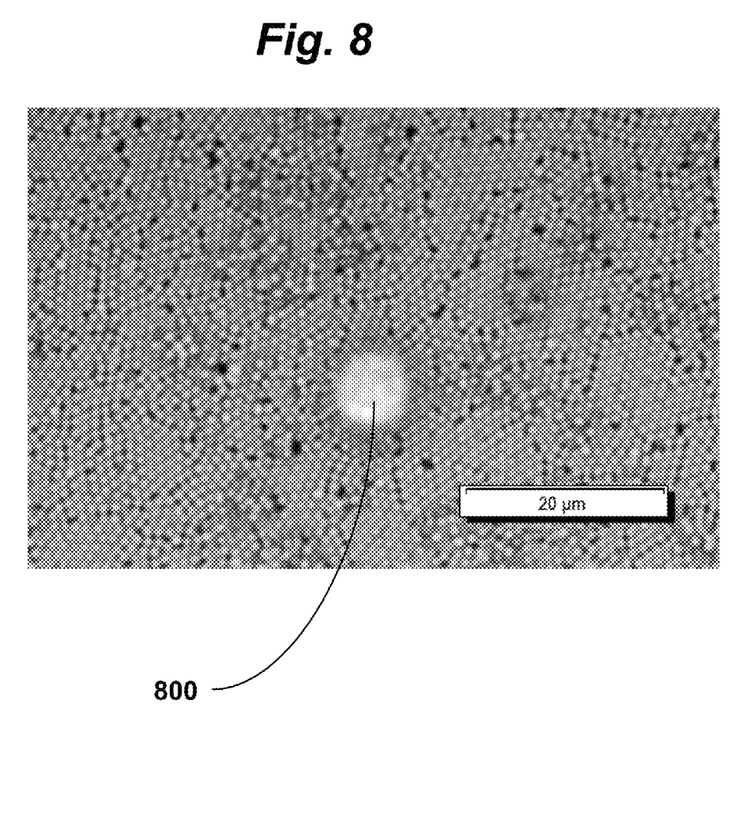
FIG. 8 is an optical microscope image that demonstrates magnification and resolution properties of dielectric microlenses, according to an embodiment of the invention.

The optical microscope image in FIG. 8 demonstrates that dielectric lenses (in this case, an 8.5 μm PMMA sphere) have magnification and resolution properties when placed on top of the nanoshell array of FIG. 5B. The light circular region 800 shows magnified photosites within it. This confirms that nanojets act as super-resolution foci.

According to an embodiment of the present invention, an architecture for a light-field sensor is provided in which microlenses for directional resolution are deposited directly on top of a nanoshell array, taking advantage of the presence of a focus in close proximity to a dielectric particle. In this architecture, the microlenses have a very small f-number ratio (focal length/entrance pupil), relaxing the constraint on the aperture size of the main camera lens. However, for this architecture to be suitable for light-field sensors, nanojets must be preserved when the microlenses are arrayed and through high angles of incident light.

Figure 9A:
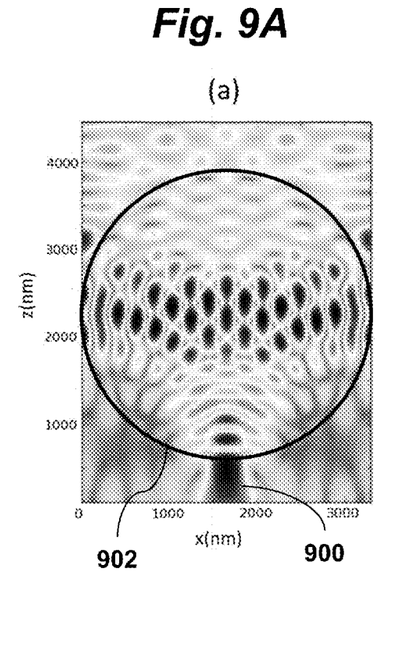
FIGS. 9A and 9B are field intensity graphs showing super-resolution focusing of nanojets in microlenses, according to an embodiment of the invention.

FIG. 9A shows the formation of a super-resolution focus 900 with a narrow beam waist beneath a microlens 902. The microlens size is limited by the Mie Theory (approximately in the range of less than 9 μm for polymers and glass). In this embodiment, a FWHM intensity beam waist of 260 nm is formed on the shadow side of the microlens with incident light of 700 nm wavelength. Different embodiments of the present invention could use microlenses of different shapes (e.g. cylindrical, spherical), sizes (within the range that would still permit the formation of the super resolution focus), and materials (e.g. dielectric materials like glass or polymers). Certain embodiments could implement dyed microspheres for color filtering.

Figure 9B:
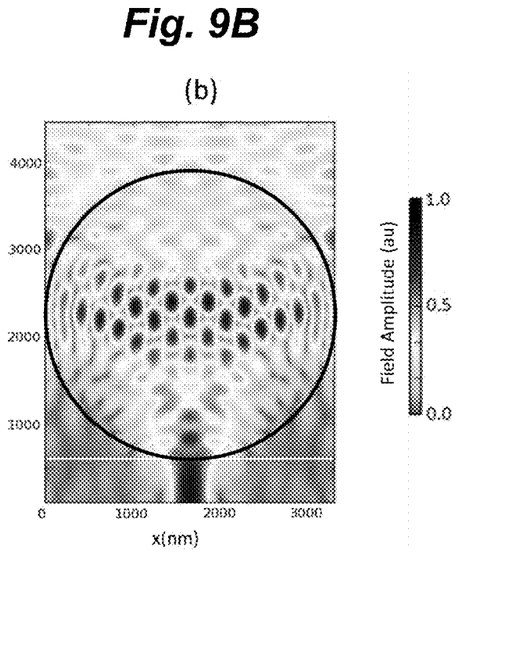

The simulated field distribution shown in FIG. 9A is for a 3.3 μm diameter microlens of refractive index 1.6 in free space. FIG. 9B shows the field distribution for the same lens placed on top of a glass slide. This is a 2D FDFD simulation with periodic boundary conditions on the left and right sides. Plane waves have the electric field perpendicular to the plane of the page and are incident from the top at a wavelength of 700 nm. The electric field ($E_y$) is shown. The FWHM intensity waist of the nanojet 900 on the shadow side of the microlens is 260 nm in both cases.

FIGS. 9A and 9B thus demonstrate nanojets in a planar array of 3.3 μm dielectric particles suspended in space and placed above a dielectric substrate. Although the shape of the nanojet is altered by the presence of the substrate, the intensity beam waist remains approximately the same (260 nm for 700 nm incident light). Through coupling of the photonic nanojets from the microlenses into the nanoshells and the decoupling of the nanoshells from each other, unique patterns of light are observed on the photosites even at very high angles of incidence with a clearly identifiable intensity peak.

To permit coupling from the microlenses to the nanoshells, the photonic nanojet preferably extends from the lens to the nanoshell. Photonic nanojets are not a near field effect, and so the resonator elements should be within a few wavelengths of the circumference of the microlens or the nanojet would spread over several spheres. Equivalently, the volume enclosed by the nanoscale resonator detector elements should be at least as large as the volume enclosed by the nanojet to prevent the spread of the nanojet over several spheres. The resonant detector elements should thus be placed within the focus of the photonic nanojet, which will depend on the exact refractive indices involved but is on the order of a few wavelengths.

Figure 10A:
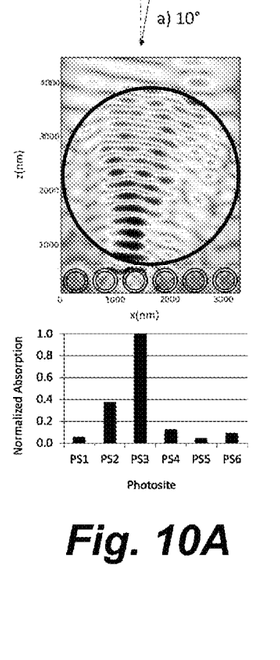
FIGS. 10A, 10B, 10C show field distributions and corresponding absorption profiles of light at incident angles of 10°, 22°, and 35°, respectively, for microlenses positioned above six nanoshell photosites, according to an embodiment of the invention.
Figure 10B:
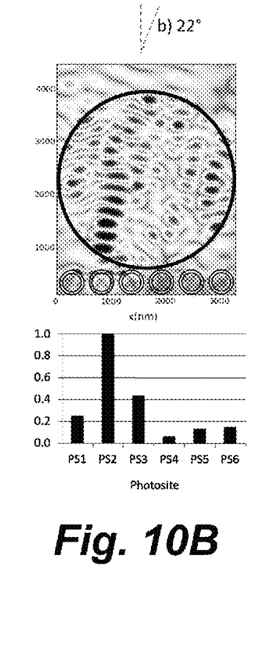
Figure 10C:
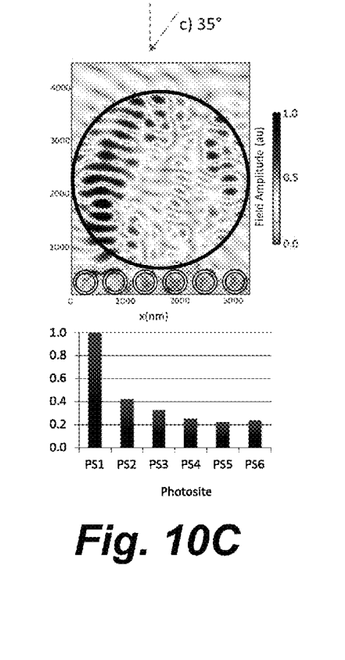

FIGS. 10A, 10B, 10C show field distributions and absorption profiles of 700 nm light at incident angles of 10°, 22°, and 35°, respectively, in an embodiment camera sensor integrating nanoshells of inner diameter 350 nm and thickness 50 nm with microlenses with a diameter of 3.3 μm. These figures are from a 2D FDFD simulation with periodic boundary conditions on the left and right sides. Plane waves have the electric field perpendicular to the plane of the page and are incident from the top at a wavelength of 700 nm. The magnetic field ($H_x$) is shown to clarify the direction of light propagation. This embodiment includes a planarization layer which can be formed by a polymer, glass, or any other suitable material. The planarization layer preferably has a refractive index >1 and fills in the spaces between the shells and also adds <50 nm of separation between the shells and the lenses. This layer is helpful in minimizing cross-talk but is not necessary.

A color filter array could be integrated into this layer in some embodiments. As evidenced by the normalized absorption profiles below each field distribution, the absorption profile is unique through angles of incidence up to 35° off normal. Note the clear correspondence between the incident angle and the photosite absorption pattern. At angles of 10°, 22°, and 35°, a circulating resonance is excited in only one nanoshell. Further, although there is some coupling of stray fields into the nanoshells and crosstalk between the photosites, the absorption pattern produced for each incident angle is unique.

The integrated structure thus demonstrates not only the favorable absorption properties of the nanoshell layer but also directional resolution over a large range of incident angles.

The embodiment of FIGS. 10A, 10B, 10C correspond to an architecture for a light field sensor integrating an array of 3.3 μm diameter polymer microlenses on top of an array of silicon nanoshells, each 50-nm thick with an inner diameter of 175 nm. The nanoshells are separated by 100 nm with a 50 nm silicon underlayer (forming individual photosites similar to a structure used for electrical simulations in a previous study).

The structure includes an oxide layer surrounding the shells for passivation, planarization, and to suppress crosstalk.

Figure 11A:
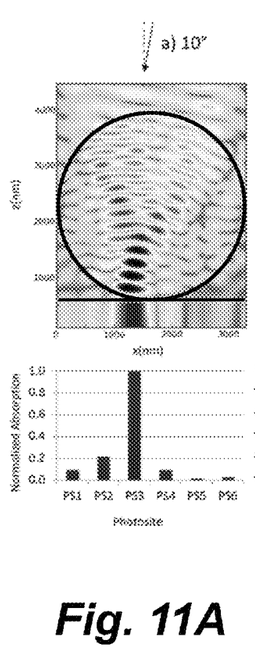
FIGS. 11A, 11B, 11C show field distributions and corresponding absorption profiles of light at incident angles of 10°, 22°, and 35°, respectively, for microlenses positioned above a conventional planar photosite sensor.
Figure 11B:
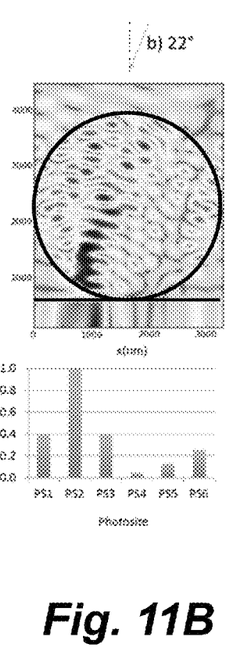
Figure 11C:
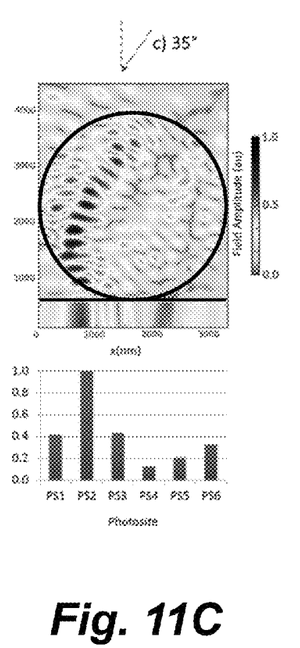

The above results for a device of the invention contrast strongly with those illustrated in FIGS. 11A, 11B, 11C from a conventional planar photosite sensor incorporating microlenses with photonic nanojets. These figures show the simulated field distribution and relative absorption in a planar silicon light field sensor under angles of incidence 10°, 22°, and 35°, respectively. This is a 2D FDFD simulation with periodic boundary conditions on the left and right sides. Plane waves have the electric field perpendicular to the plane of the page and are incident from the top at a wavelength of 700 nm. The magnetic field ($H_x$) is shown to clarify the direction of light propagation. Significantly, although the nanojet from the microlens is visible at small off-normal angles of incidence and there is little crosstalk between adjacent pixels, at larger angles the intensity spreads across photosites severely; in fact, the intensity distributions at 22° and 35° incidence are almost indistinguishable. Thus, angular resolution is lost at these higher angles of incidence.

Figure 12A:
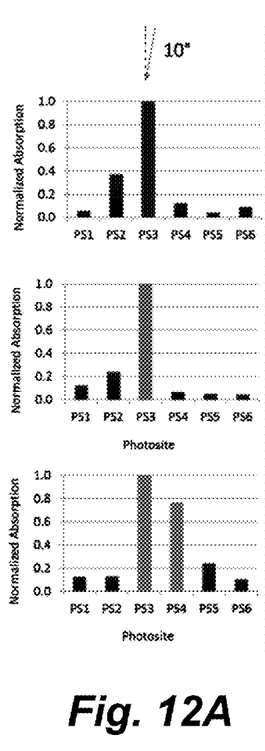
FIGS. 12A, 12B, 12C show absorption profiles for red, green, and blue incident light at incident angles of 10°, 22°, and 35°, respectively, according to an embodiment of the invention.
Figure 12B:
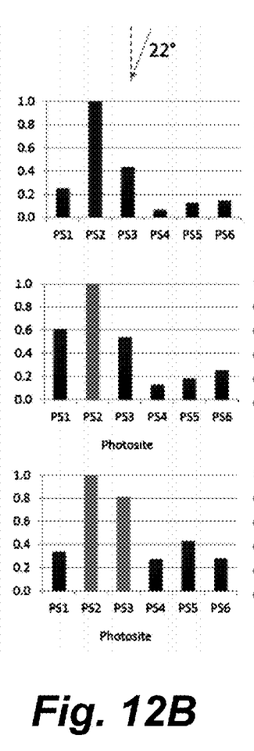
Figure 12C:
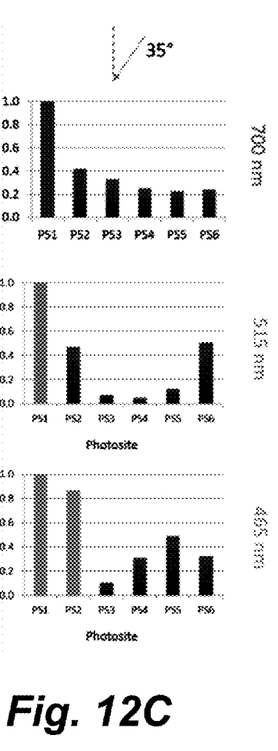

FIGS. 12A, 12B, 12C show absorption profiles for red (top), green (middle) and blue (bottom) light at incident angles of 10°, 22°, and 35°, respectively, in an embodiment camera sensor integrating nanoshells of inner diameter 350 nm and thickness 50 nm with microlenses with a diameter of 3.3 μm. These figures show unique profiles and confirm that angular resolution is maintained at various wavelengths in the visible spectrum.

Figure 13A:
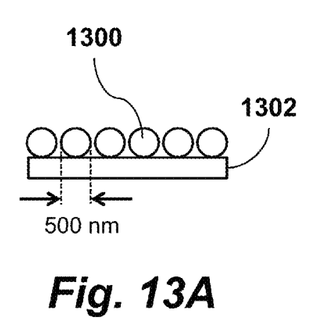
FIGS. 13A, 13B, 13C, 13D show a series of microfabrication steps according to an embodiment of the invention.
Figure 13B:
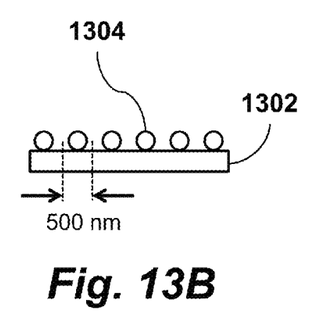
Figure 13C:
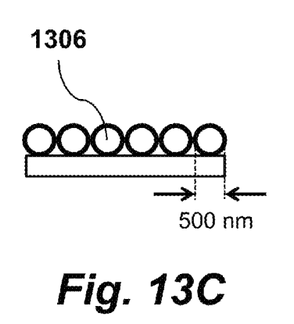
Figure 13D:
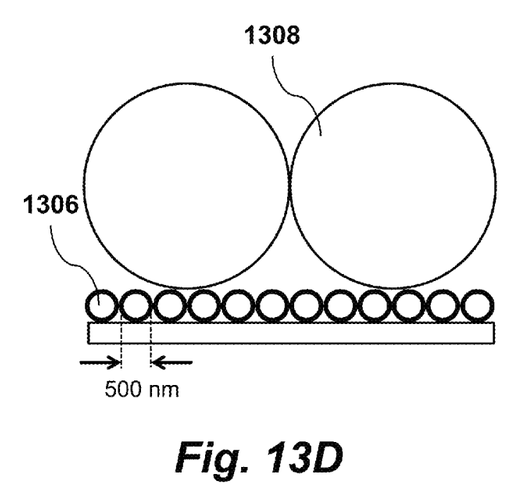

FIGS. 13A, 13B, 13C, 13D show a series of microfabrication steps according to an embodiment of the invention. FIG. 13A shows silica nanospheres 1300 that have been self-assembled on a substrate 1302 using Langmuir-Blodgett coating or another suitable technique. Selective dry-etching separates the silica nanospheres by shrinking their diameter, resulting in the structure shown in FIG. 13B wish shrunken nanospheres 1304. The selectivity of the etch determines whether the substrate is also etched. LPCVD silicon is then used to overcoat the nanospheres. The nanospheres themselves are then etched away using hydrofluoric acid, leaving a layer of nanoshells 1306, resulting in the structure shown in FIG. 13C. A spacer layer of PMMA or any other suitable material can be spin-cast onto the nanoshell array if desired. Polystyrene microspheres (or microspheres of any other suitable material) 1308 are then self-assembled over top of the nanoshells 1306 to form a layer of microlenses using dip-coating or another suitable technique, as shown in FIG. 13D.

The advantages of the nanoshells coupled to the microlenses are as evident in experiment as they were in simulation.

The invention claimed is:
1. A light field sensor comprising:
   a) a collection of nanoscale resonator detector elements arranged in a layer; and
   b) a collection of dielectric microlenses arranged in a layer;
   wherein each microlens of the dielectric microlenses has a refractive index and size selected such that the microlens focuses incident light at an operational wavelength into a beam having a full-width-half-maximum intensity beam waist of less than one half of the operational wavelength when measured adjacent to the microlens;
   wherein each element of the nanoscale resonator detector elements encloses a volume of at least that enclosed by the full-width-half-maximum intensity beam waist of the beam focused by a microlens onto the nanoscale resonator detector element;
   wherein each element of the nanoscale resonator detector elements has a total external leakage rate to adjacent detector elements that does not exceed an intrinsic leakage rate of the element due to absorption.
2. The light field sensor of claim 1 wherein the collection of nanoscale resonator detector elements are packed in a plane such that a minimum fill fraction in the plane is 82%.
3. The light field sensor of claim 1 wherein the microlens has a shape selected from the group consisting of sphere, cylinder, and ellipsoid.
4. The light field sensor of claim 1 wherein the microlenses filter color.
5. The light field sensor of claim 1 wherein the nanoscale resonator detector elements are nanocones.
6. The light field sensor of claim 1 wherein the nanoscale resonator detector elements are nanoshells.
7. The light field sensor of claim 6 wherein the nanoshells are composed of semiconductor materials.
8. The light field sensor of claim 1 wherein the nanoscale resonator detector elements are surrounded by a planarization layer.
9. The light field sensor of claim 8 wherein the planarization layer is composed of glass or polymers.
10. The light field sensor of claim 8 wherein a color filter array is integrated into the planarization layer.

* * * * *